United States Patent [19]
Haner

[11] Patent Number: 6,049,187
[45] Date of Patent: Apr. 11, 2000

[54] SPEED CONTROL FOR BRUSHLESS REPULSION MOTOR

[75] Inventor: Lambert Haner, Rocky River, Ohio

[73] Assignee: Dynamotors, Inc., Cleveland, Ohio

[21] Appl. No.: 09/223,981

[22] Filed: Jan. 4, 1999

Related U.S. Application Data

[63] Continuation-in-part of application No. 08/919,537, Aug. 28, 1997, Pat. No. 5,936,374, which is a continuation of application No. 08/535,339, Sep. 28, 1995, Pat. No. 5,686,805, which is a continuation of application No. 08/305,575, Sep. 14, 1994, Pat. No. 5,491,398, which is a continuation of application No. 08/037,246, Mar. 26, 1993, Pat. No. 5,424,625.

[51] Int. Cl.$^7$ .................................................... H02P 6/08
[52] U.S. Cl. .............................................. 318/725; 318/439
[58] Field of Search ..................................... 318/138, 254, 318/430, 439, 700, 720, 721, 723, 724, 725, 726

[56] References Cited

U.S. PATENT DOCUMENTS

| | | |
|---|---|---|
| 1,122,490 | 12/1914 | Flynn . |
| 1,205,937 | 11/1916 | Rouzet . |
| 1,624,378 | 4/1927 | Weber . |
| 2,524,035 | 10/1950 | Bardeen et al. . |
| 2,569,347 | 9/1951 | Shockley . |
| 3,003,095 | 10/1961 | Barnes . |
| 3,603,161 | 9/1971 | Schwarz . |
| 3,633,084 | 1/1972 | Rakes . |
| 3,667,011 | 5/1972 | Casaday et al. . |
| 3,667,018 | 5/1972 | Rakes . |
| 3,891,874 | 6/1975 | Roters et al. . |
| 3,900,780 | 8/1975 | Tanikoshi . |
| 3,917,988 | 11/1975 | Payne . |
| 4,005,347 | 1/1977 | Erdman . |
| 4,088,908 | 5/1978 | Gumen et al. . |
| 4,156,169 | 5/1979 | Imamura . |
| 4,158,795 | 6/1979 | Tarumi et al. . |
| 4,160,200 | 7/1979 | Imamura et al. . |
| 4,169,990 | 10/1979 | Lerdman . |
| 4,184,107 | 1/1980 | Turini et al. . |
| 4,227,133 | 10/1980 | Imamura . |
| 4,228,396 | 10/1980 | Palombo et al. . |
| 4,311,933 | 1/1982 | Riggs et al. . |
| 4,375,049 | 2/1983 | Grand Chavin . |
| 4,449,086 | 5/1984 | Hoffmann et al. . |
| 4,459,502 | 7/1984 | El-Antably . |
| 4,479,079 | 10/1984 | Hanner ................................ 318/541 X |
| 4,535,279 | 8/1985 | Arbisi et al. ............................ 318/696 |
| 4,584,505 | 4/1986 | Chung et al. . |
| 4,634,950 | 1/1987 | Klatt . |
| 4,700,115 | 10/1987 | Gleim et al. ............................ 318/254 |
| 5,059,876 | 10/1991 | Shah . |
| 5,262,717 | 11/1993 | Bolegoh . |
| 5,528,113 | 6/1996 | Boys et al. . |

*Primary Examiner*—Bentsu Ro
*Attorney, Agent, or Firm*—Vickers, Daniels & Young

[57] ABSTRACT

An armature mounted armature speed control system for a brushless repulsion motor of the type including a series of coil switches on the armature for shorting a succession of armature coils and detectors on the armature for operating each of the switches when the armature coil shorted by a switch is at a selected rotational position, the system comprising: a ring counter with sequentially energized output lines for receiving signals in sequence at a rate controlled by the reference frequency of count pules at the input of the counter, means for operating the switches in sequence by the counter created signals to control the speed of the armature at a set point and a selector switch shiftable upon receipt of a shift signal between a first condition with the signals from said counter operating the coil switches and a second condition with the detectors operating the coil switches.

16 Claims, 8 Drawing Sheets

SPEED CONTROL FOR BRUSHLESS REPULSION MOTOR

This application is a continuation-in-part of application Ser. No. 08/919,537, filed on Aug. 28, 1997, now U.S. Pat. No. 5,936,374, which is a continuation of application Ser. No. 08/535,339, filed on Sep. 28, 1995, now U.S. Pat. No. 5,686,805, which is a continuation of application Ser. No. 08/305,575, filed on Sep. 14, 1994, now U.S. Pat. No. 5,491,398, which is a continuation of application Ser. No. 08/037,246, filed on Mar. 26, 1993, now U.S. Pat. No. 5,424,625.

The present invention relates to a speed control for an existing brushless repulsion motor and a method of implementing the speed control in a repulsion motor that is constructed to negate the need for the brushes.

BACKGROUND OF THE INVENTION

The invention relates to a motor construction that exhibits the desirable characteristics of a brush-type repulsion motor, but eliminates the conventional brushes of such a motor and their recognized disadvantages. Electronic switching means is carried on the rotating armature to short individual coils at appropriate times in a cycle of armature rotation to eliminate the need for brush and commutator elements.

The electronic switching means is in the form of power semi-conductors carried on the rotating armature. More specifically, one electronic switch circuit is provided for replacing the switch and current carrying function of one pair of oppositely disposed commutator segments or bars. Any electrical power needed to energize the electronic switching means and any related control circuitry on the armature is produced on the armature by induction from the stator field.

The control electronics on the armature includes means to sense the angular position of the armature relative to the stator in order to control the actuation of the electronic switches.

The control circuitry is operative when a coil is at a predetermined angular position, relative to the stator, to switch an appropriate electronic switch to short the ends of an associated coil together. The result of this short is essentially the same as that achieved by a pair of opposed shorted brushes.

Where the control circuitry on the rotor senses a reference point associated with the stator, the reference point or marker can be moved to different angular locations relative to the stator to change torque, speed and/or direction of the rotor. By electronically controlling the location of the reference point or marker to control torque magnitude and direction, a servomotor can be made. A significant advantage, here, is that a power amplifier is not necessary since the motor is connected directly to the AC power line.

In the repulsion design to which the invention is directed, the power electronics need only control the connections in the armature. Therefore, a large amount of mechanical power developed by the motor is controlled with power electronics that is relatively small in power handling capacity. For example, in terms of power handling capacity, the power electronics can conceivably be one-fifth to one-tenth the size of an inverter unit that would be required to drive a conventional induction motor of equivalent motor power output. The brushless repulsion motor offers other advantages.

Application of the brushless repulsion motor to replace universal series motors has the additional advantage of not having any exposed active electrical parts. This means less of an electrical shock hazard to the user of equipment such as hand tools.

Many other performance advantages and/or features accrue to the brushless repulsion motor as compared to conventional AC and DC motor designs. The electronic switch can be designed such that its opening and closing is modulated by factors other than relative position between the rotor and stator. This capability allows the design of special or tailored speed/torque curves. This capability can also provide for a more efficient conversion of energy on start-up which lowers start-up currents and thereby eliminates the need to employ separate electronic "reduced voltage" start-up controls found in many industrial applications and which are added items of expense.

With regard to the use of the brushless repulsion motor as a servomotor, its performance characteristics are exceptionally good with respect to dynamic response. With the brushless repulsion motor, only a part of the total amount of electrical power is contained in the rotor/armature, therefore the electronics need not process all of the electrical power. By contrast, in a permanent magnet DC servomotor known in the art, all of the electrical power must enter and be processed through the armature by an external electronic power control or amplifier. The electrical time constant of the armature is a dominant factor that limits the dynamic response. In modern high performance AC servos an induction motor is used with a control algorithm referred to as "flux vector control" or "field oriented control". All of the electrical power is supplied by an external power amplifier or inverter and the control calculates the relative position of the stator field to the rotor field to provide optimum control response. Here again, the limitations involve the rotor electrical time constants and the stator electrical time constants. Also, the torque in the brushless repulsion motor, is developed by a change in relative position of the rotor field and stator field. Changing this position requires only to change an external reference marker position and this can be done in many ways that are extremely fast. For example, photodiodes and phototransistors can be used to change the position of the reference marker. The electrical time constant of the rotor/armature is also a diminished factor because not all of the windings are switched at the same time and this creates, in effect, a reduced time constant.

This brushless repulsion motor with reference markers at fixed positions around the stator has a speed dependent upon the applied torque to the rotating armature. Consequently, as the torque is decreased, the speed increases. In a like manner, as the torque increases, the speed decreases. Thus, this highly beneficial brushless repulsion motor is deficient in the area of speed control. The armature speed can not be controlled at a desired operating speed without external circuitry.

STATEMENT OF INVENTION

The brushless repulsion motor using fixed external markers with switch activated detectors on the armature to short selected coils has been modified to include a secondary concept for adding speed control to the brushless repulsion motor. The coil switches on the armature are sequentially actuated by a counter producing a series of switch actuating signals in the desired sequence for shorting the coils around the armature in the proper sequence and at a set frequency. By changing the output frequency of the counter, the speed at which the coils of the armature are shorted is changed. In this fashion, the armature rotates at the speed determined by the clocking frequency of the counter and can be adjusted to a fixed set speed by changing the frequency of the counting pulses used in the counter. Thus, an oscillator on the armature can be adjusted to set the desired speed of the armature. This novel system has proven quite beneficial in providing speed control for a repulsion motor wherein the armature coils are sequentially shorted in the desired position to maintain a fixed, set armature speed. In using this concept, the detectors of the prior brushless repulsion motor are deactivated and the armature speed is set and maintained by the rate of sequential switching signals from the counter. This is an improvement in the brushless repulsion motor; however, as the torque on the armature increases, there reaches a speed where the speed can no longer be maintained at the output frequency of the counter. At that instant, which is the maximum torque for a given speed set by the counter frequency, the motor tends to stall. This is the disadvantage of using the speed control employing a frequency driven counter as a speed control. Thus, an aspect of the invention is to provide the concept of a counter type speed control with the positional marker operation of the brushless repulsion motor whereby the speed of the motor can be maintained by the counter until a maximum torque is sensed by a tendency of the armature speed to decrease below the set speed. Thereafter, the motor operating mode is shifted to the speed/torque curve of the existing brushless repulsion motor using a fixed marker.

In accordance with the present invention, there is provided an armature mounted speed control system for a brushless repulsion motor of the type including a series of coil switches on the armature for shortening a succession of armature coils and also detectors on the armature for alternatively operating each of the switches when the armature coil shorted by the switch is at a selected rotational position. In the previous implementation of this type brushless repulsion motor, only external markers at the desired position are used to activate the switches on the armature as particular coils are in the desired position with respect to the field of the motor. In accordance with the invention, a ring counter with sequentially energized output lines receive signals in sequence at a rate controlled by the reference frequency of the count pulses at the input of the counter is used as an alternative scheme to control the speed of the armature at a set speed. A selector switch is shiftable upon receipt of a shift signal between a first condition with the signals from the counter operating the coil switches and a second condition with the positionally fixed detectors operating the coil switches.

In accordance with another aspect of the invention, the frequency of the count pulses at the input of the ring counter is changed to adjust the set speed of the armature. Further, there is means for sensing a decrease in the speed of the armature to shift the selector switch from the first condition to the second condition. In this manner, the speed control of the counter is operative until a maximum torque is reached. At that time, the detector mode of operation is activated for providing a speed/torque operating curve for the brushless repulsion motor.

In accordance with another aspect of the present invention there is provided a method of operating a brushless repulsion motor of the type including a series of switches on the armature for shorting a succession of armature coils and positional detectors on the armature for operating each of the switches when the armature coil shorted by a switch is at a selected rotational position. This method involves the steps of maintaining a set armature speed by deactivating the detectors and operating the switches in sequence at a set frequency, sensing when the armature speed is reduced due to reaching maximum torque and then closing the switches when the respective coils are in a selected rotational position by activating the detectors and deactivating the set frequency operation of the switches. This method is further implemented by adjusting the set frequency to maintain the fixed speed at a desired level prior to shifting into the normal mode of operation where the positional detectors close the switches to short the coils.

The primary object of the present invention is the provision of a brushless repulsion motor of the type having external positional markers or detectors on the armature for operating the motor, which repulsion motor includes a speed control system or method utilizing a counter that closes the coil shorting switches at a fixed rate to maintain a fixed armature speed until a high torque is reached.

Still a further object of the present invention is the provision of a speed control for a brushless repulsion motor, of the type defined above, which speed control causes the motor to operate at a fixed speed until a preselected torque is reached and then causes the motor to operate on a variable speed/torque operating curve.

Still another object of the present invention is the provision of a system and method of controlling the speed of a brushless repulsion motor, as defined above, which system and method maintains the armature speed at a set adjustable value until a torque is reached, at which time the motor shifts into the normal operating mode using fixed positional markers. These and other objects will become apparent from the following description taken together with the accompanying drawings.

DESCRIPTION OF THE PREFERRED EMBODIMENT

Figure 1:
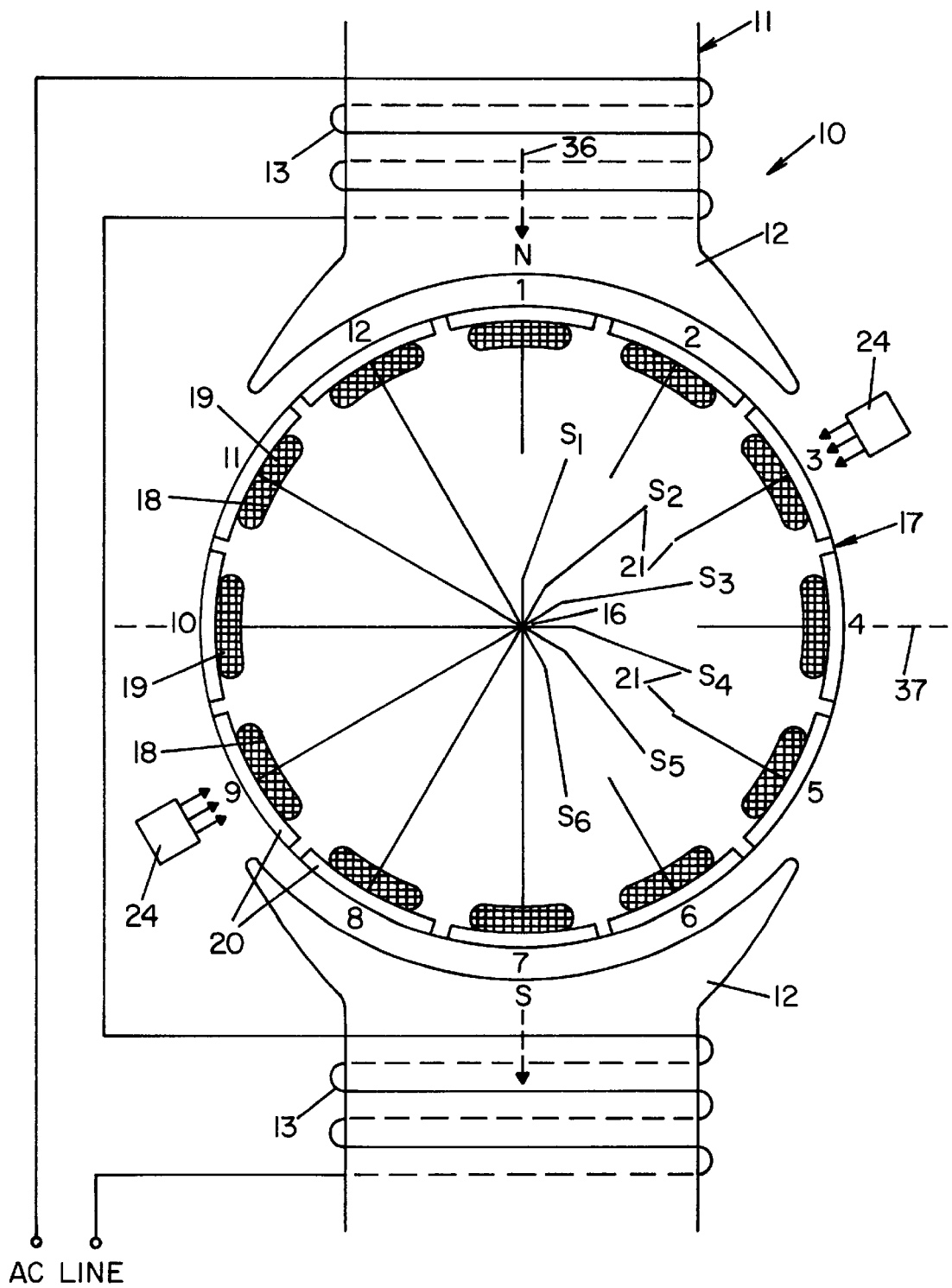
FIG. 1 is diagrammatic axial view of a two-pole repulsion motor constructed in accordance with the present invention.

An electric motor 10 constructed in accordance with the invention is diagrammatically illustrated in FIG. 1 in a view looking axially from an electronic commutator end. The motor device 10 in the illustrated example is a single-phase two-pole repulsion motor. A motor stator 11 comprises a pair of diametrically opposed magnetic poles 12 having field windings 13 that typically are connected to 60 HZ single-phase utility power. The field windings produce a magnetic field that is in a direction indicated by an imaginary line or axis 36 extending from one pole 12 to the other. The stator 11 can be constructed in essentially the same manner as is a conventional universal series motor or a repulsion motor.

A rotor or armature 17 of the motor 10 can be constructed essentially in the same manner as a conventional universal series motor with certain exceptions or modifications discussed below. The rotor is supported for rotation about a central axis 16 by axially spaced bearings mounted on opposite ends of the stator in a conventional manner, for example. The rotor 17 has a plurality of axial or longitudinal slots 18 on its periphery into which are fitted a plurality of generally longitudinal coils 19. Typically, the coils 19 have many turns and each slot 18 receives the sides of more than one coil 19. The coils 19 are terminated on commutator segments or bars 20 in accordance with conventional practice as will be understood from the description below. Additionally, the coils 19 can be terminated in other convenient ways since the invention eliminates the regular commutating service of the segments or bars 20. It will be understood from this discussion that electrical brushes such as are found in conventional repulsion motors or in universal series motors are eliminated from the construction of the motor. The motor 10 operates generally like known repulsion motors except that it includes electronic means on the rotor 17 to short the ends of the rotor winding coils 19 and thereby eliminates the need for conventional electrical brushes to do the same.

The commutator segments or coil terminations 20 are typically arranged in diametrically opposed pairs and for the purpose of the explanation of the invention, but not by way of limitation, there are twelve segments or coil termination points illustrated in certain of the disclosed constructions. Associated with each pair of segments 20 is an electronic switch circuit 21 diagrammatically represented at 21 in FIG. 1 and in component form in FIG. 2. In elementary terms, it will be understood from the description below that at appropriate times in the rotation of the rotor 17, electronic switches will be individually closed or rendered conductive to short, i.e. electrically connect their respective segments 20 together. As with conventional repulsion motors, with the field windings 13 energized and appropriate commutator segments 20 shorted, the effect is to develop torque and rotation between the rotor 17 and stator 11.

Figure 2:
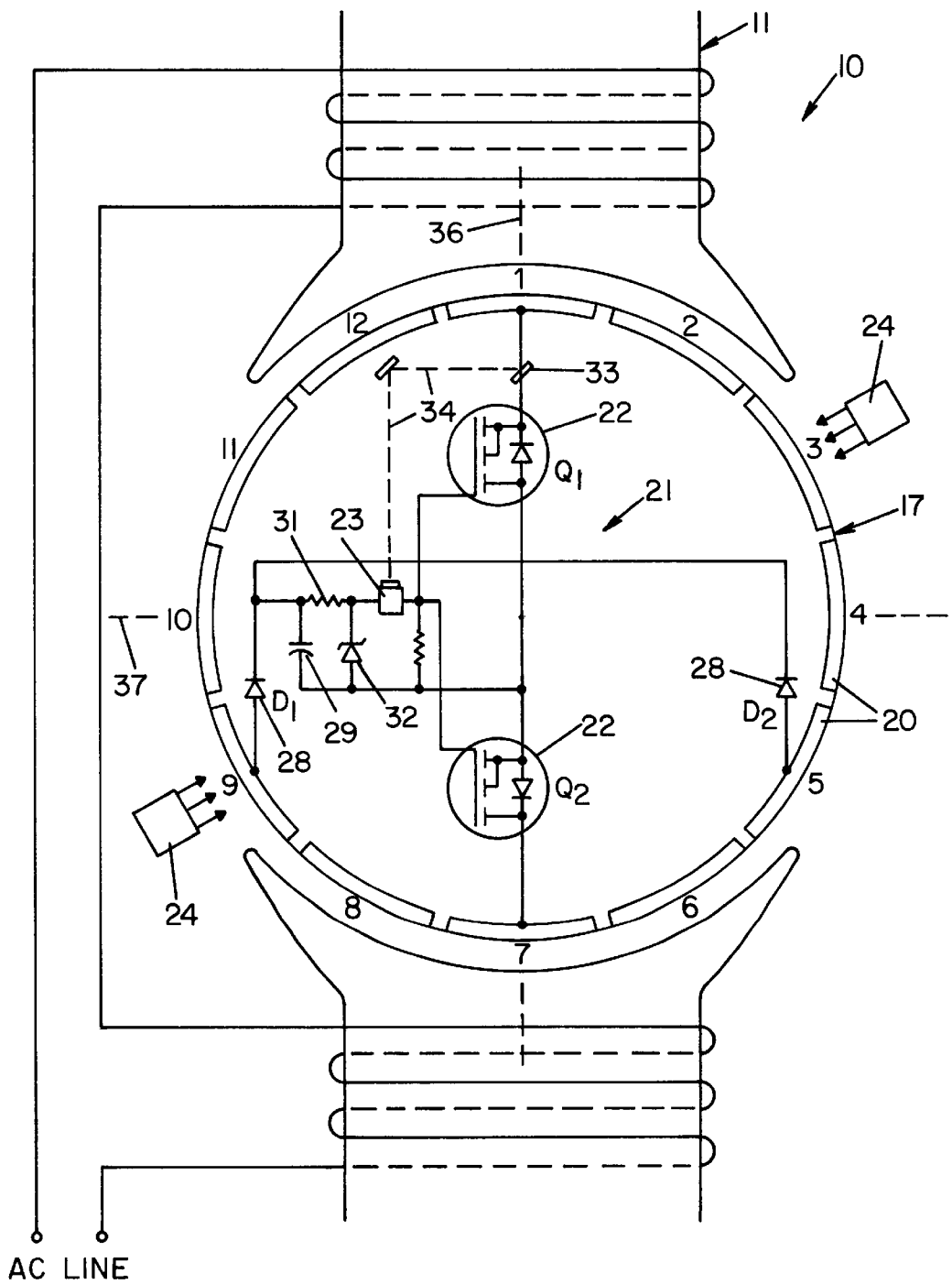
FIG. 2 is a diagram of an electronic circuit that serves to selectively shunt a typical pair of opposed commutator segments, or their equivalents for winding termination, in place of the action of a pair of conventional electrical brushes, it being understood that one such circuit is provided for each pair of opposed commutator bars or segments.

With reference to FIG. 2, a typical electronic switch circuit 21 comprises a pair of power MOSFET transistors 22 and a triggering device such as a phototransistor 23. The output terminals of the power transistors 23 are connected individually to the diametrically opposed segments 20 numbered, clockwise, 1 and 7 while their inputs are connected in common. The phototransistor 23 and power transistors 22 are energized by related electronic circuitry comprising a pair of diodes 28, a capacitor 29, a resistor 31 and a zener diode 32. The inputs of the diodes 28 are connected to segments 20, numbered 5 and 9, other than the segments 20 (1 and 7) associated with the power transistors 22. Since voltages vary between various armature windings during rotation of the rotor 17, a voltage (limited by the zener diode 32) is developed on the capacitor 29 sufficient to operate the phototransistor 23 and power transistors 22. When the phototransistor 23 is illuminated by a suitable light source 24, it switches on and, in turn, switches on the power transistors 22 through their gates placing them in a conductive state.

The electronic switch 21, with its associated circuitry illustrated in FIG. 2, is replicated for each pair of segments 20, but for clarity in the drawings, this replication is not shown. It will be understood that the electronic switches 21 and related energizing circuitry for all of the segment pairs 20 are suitably fixed to the rotor so that the same rotates in unison with the rotor. For heat transfer or other reasons, the electronic switch components and related circuitry can be carried on the rotor outside of the stator by interconnecting the same to the segments 20 with wires that run along the rotor shaft, in a slot or central hole, through the associated conventional shaft bearing.

For purposes of explanation, with reference to the embodiment of FIGS. 1 and 2 and like embodiments, it will be assumed that the angular extent and relationship, with reference to the axis of rotation of the rotor 17 of the segments 20 to the armature coils 19 is like that of a conventional repulsion or universal series motor and, further, that the phototransistors 23 each have a window or light receptor, in an angular sense, that is centered at a bisector of the arc of an associated segment 20 and have a field of view, in the angular sense, generally coextensive with the arcuate extent of a typical commutator segment 20. That is, the angular location of each light receiving means for a phototransistor 23 is at the same angular center as in associated segment 20. In FIG. 2, the light window or receiving means is shown diagrammatically as a mirror 33 in a light path 34 to the phototransistor 23. Other control signal receiving arrangements include prisms, fiber optics or the direct positioning of the phototransistor 23 at the actual angularly centered station for receiving a control signal from the light source 24. In this embodiment, all of the signal receiving means in the form of mirrors 33 and the light source 24, which is duplicated at diametrically opposite points, all lie in a common plane transverse to the axis of rotation of the rotor 17. Consequently, the circular path or orbit of each signal receiving mirror means 33 for each set of commutator segments 20 is the same as that of the others.

The light sources 24 provide a pair of diametrically opposed position reference markers and are suitably mounted or supported on the stator 11 at approximately the 2 o'clock and 8 o'clock positions in the showing of FIG. 2. These reference markers 24, when the electronic circuit 21 includes a phototransistor 23 or other light sensitive device, comprise known devices such as a light emitting diode (LED) or an incandescent bulb powered by the AC line and any necessary power supply. The position reference markers or light sources 24 are located so that the light signal or radiation emitted from them shines in a beam that radially intersects the path or orbit of the signal receptors or mirrors 33 for the phototransistors 23. With the stator windings 13 and reference marker light sources 24 energized, the relevant electronic switch 21, represented by $S_3$ in FIG. 1 will cause its associated segments 20 (numbered 3 and 9) to be shorted.

This results from the light of the reference marker 24 energizing the phototransistor 23 to energize the associated power transistors 22.

Analogous to the situation in a conventional repulsion motor, when a pair of segments 20, in an angular position other than aligned with a hard neutral axis 36 corresponding to the 12 o'clock/6 o'clock locations or aligned with a soft neutral axis 37 corresponding to 3 o'clock/9 o'clock locations are shorted and the stator windings 13 are energized with an AC voltage, the rotor 17 will develop a torque and will rotate. In the case illustrated in FIG. 1, the electronic circuit represented by the symbol $S_3$ is activated by the light source 24. In the showing of FIGS. 1 and 2 where the reference marker lights 24 are disposed approximately at the 2 o'clock and 8 o'clock positions, torque and rotation of the rotor 17 will be induced in a clockwise direction. As the light signal receiving mirror 33 associated with the circuit $S_3$ moves away from the influence of the reference marker light 24, the signal receiving mirror 33 of the adjacent circuit $S_2$ moves into such influence and rotor rotation is thereby continued. A study of FIG. 1 reveals that each circuit $S_i$ will be energized for shorting its respective segment pairs 20 twice each revolution—once at each arrival of the mirror 33 at the diametrically opposed reference marker light sources 24.

From the foregoing it will be understood that the circuits $S_1$–$S_6$ in combination with the reference marker light sources 24 perform the segment shorting function previously performed by electric brushes and commutator segments in conventional repulsion motors.

Like the action in a conventional repulsion motor, where the angular position of the reference marker lights 24 is moved away from the 2 o'clock/8 o'clock position counter clockwise towards the hard neutral axis 36, the torque and speed developed by the motor generally increases. With the lights 24 very close to hard neutral axis 36, torque decreases and is zero when centered at this location. Where the lights 24 are moved clockwise from the 2 o'clock/8 o'clock position past the soft neutral axis 37 to the 4 o'clock/10 o'clock positions, the rotor rotates in the opposite direction, i.e. counter clockwise with torque and speed increasing with increasing angular displacement of the brushes from the neutral axis 37.

Figure 3:
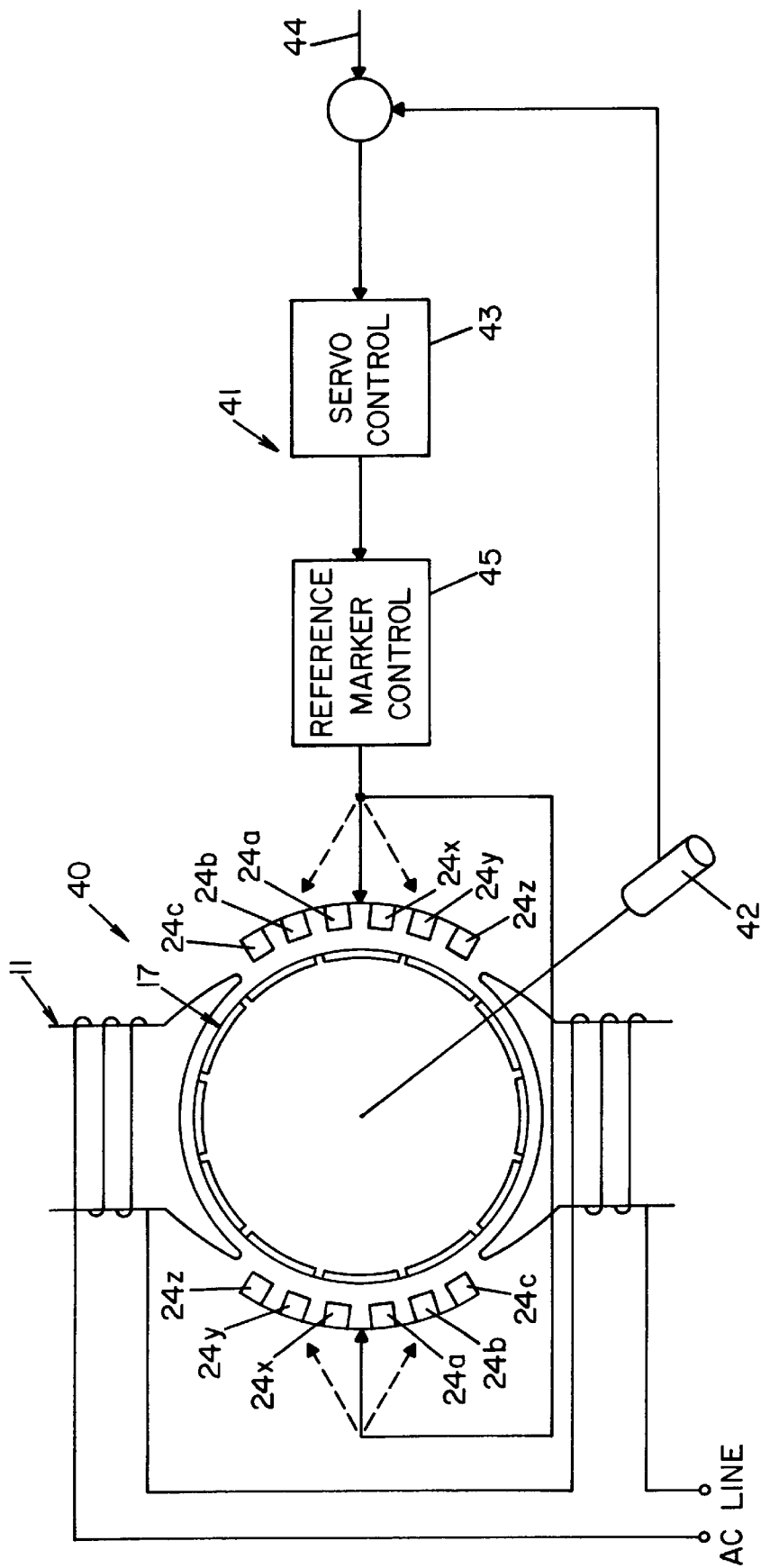
FIG. 3 is a schematic diagram of a repulsion motor and related servo-control circuit in accordance with the invention.

The variable torque, speed and directional characteristics of the repulsion motor of the present invention make it particularly suited as a servomotor 40. FIG. 3 is a diagrammatic representation of such a unit. The armature or rotor 17 and stator 11 of the motor 40 are essentially the same as that described in connection with FIGS. 1 and 2 except for the reference marker or light source arrangement 24. In the present structure, a plurality of pairs of diametrically opposed of reference marker light sources 24a–24c, 24x–24z are disclosed circumferentially about the rotor. Typically, the reference markers 24 all lie in a plane transverse to the axis of the rotor 17 and common to the signal receivers or mirrors 33. FIG. 3 illustrates a servocontrol circuit 41 for operating the motor 40. The speed, direction and angular position of the rotor or armature shaft is monitored by a transducer 42 that produces a signal to a servocontroller 43. A speed/position input command signal is applied to a line 44 to the servocontroller 43. The servocontroller 43 compares the reference or command signal on the line 44 with the measured signal from the transducer 42 and produces a control signal to a reference marker control 45. This reference marker control 45, in turn, activates an appropriate diametrically opposite pair of the reference markers 24a, 24b or 24c and 24x, 24y or 24z to produce a desired rotational direction, torque and/or speed of the motor rotor 17. It will be understood that the relative location of the active pair of reference markers 24 determines the speed, torque and direction of the rotor. As discussed above, the reference markers 24c and 24z closest the hard neutral axis 37 of the poles 12 generally producing high torque and speed, when activated, as compared to the reference markers 24a, 24x nearest the soft neutral axis 37. Thus, as the error signal between the command signal and the feedback transducer signal increases (in either polarity), the servocontrol will switch to the next pair of reference marks 24 in the arrays from the axis 37 towards the pole axis 36. Conversely, as the error signal reduces, the reference marker control shifts to a pair closer to the axis 37.

A variation in the construction of the servomotor 40 is the provision of a single pair of reference markers 24 that are supported for movement about an arc concentric with the rotor and are mechanically moved by an actuator controlled by the reference marker control. Other variations in the servomotor are contemplated. For example, the control of the light emitting diodes represented by the light sources 24 can be embodied as just the two pairs at the extreme ends of the arcuate array, i.e. 24c and 24y. The torque control can be achieved by pulse width modulation of the current through the LED. When the error signal increases, the LED is pulsed on for a longer time duration.

Figure 4:
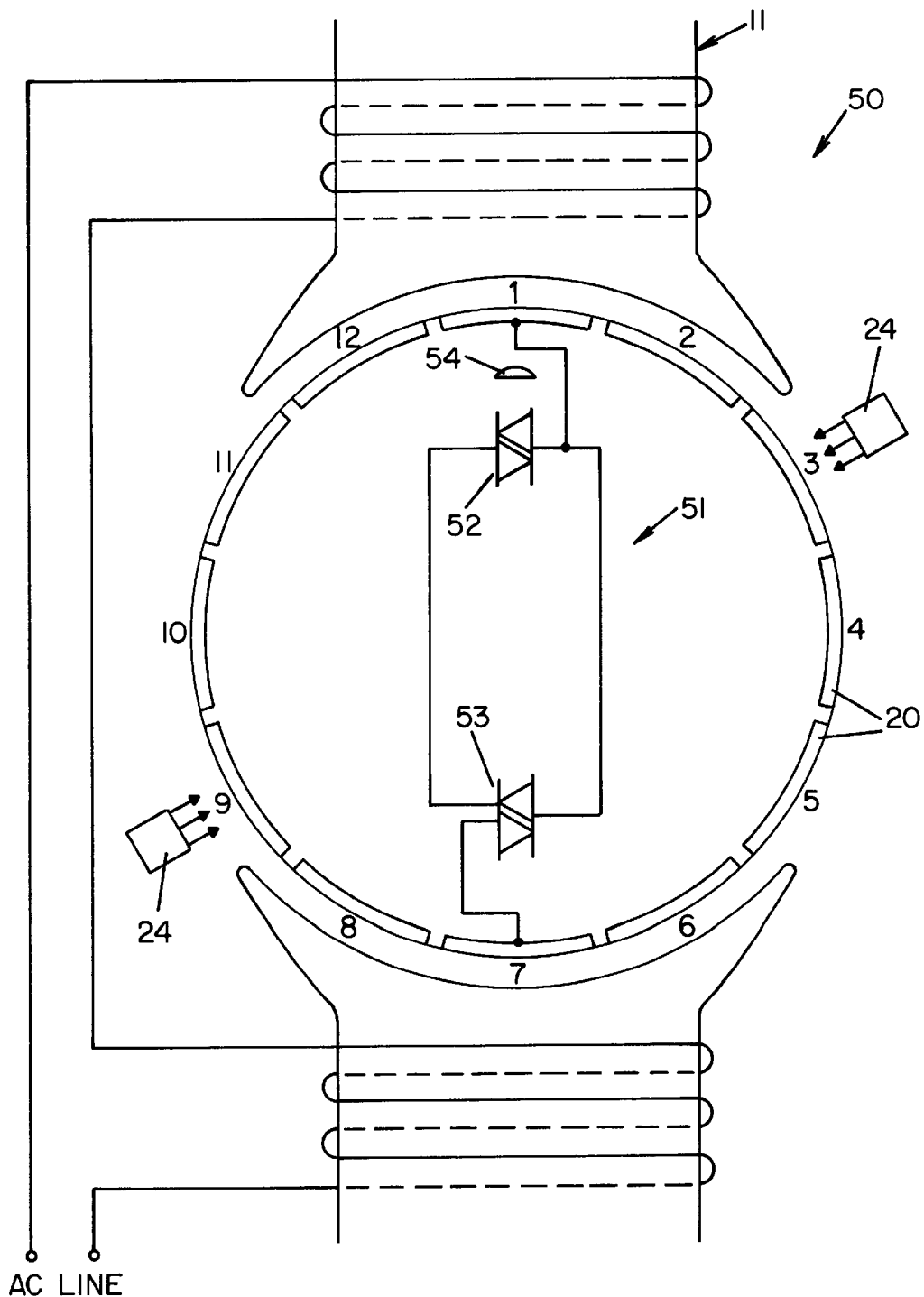
FIG. 4 is a view similar to FIG. 2 showing a different electrical circuit for each pair of opposed commutator segments.

FIG. 4 illustrates an electronic switch circuitry 51 that can be substituted for the electronic switch circuitry for the commutator pairs in place of the electronic switch circuitry 21 of FIG. 2. It has been found that the circuitry 51 when used in replication for circuits $S_1$–$S_6$ of FIG. 1 produces a synchronous motor 50. The circuitry 51 includes a phototriac 52 and an alternistor 53. Specifically, it has been found that the rotor 17 will lock onto a rotational speed that is an integral multiple of the power supply frequency. For example, if the supply frequency is the 60 HZ commercial power line and the motor is a two pole machine, then the synchronous speed will be 3600 rpm. If a four pole machine is constructed, the speed will be 1800 rpm. If the power supply frequency is adjustable, the synchronous speed will be a fixed multiple of that frequency.

The alternistor 53 is composed of two SCR's back-to-back in the same package. An alternistor has the advantage over a triac when switching inductive loads in that a snubber network is not usually required. As shown in FIG. 4, the alternistor 53 has each one of its conduction electrodes on a commutator segment (e.g. 1, 7) that is diametrically opposite the other. The phototriac 52 has its light receiving area schematically designated at 54. Similarly to the circuit operation described in connection with FIG. 2, the switch 51 will be activated twice per each revolution of the rotor where two LEDs or reference markers 24 are provided. When the rotor 17 moves and the phototriac 52 has passed the area of influence of the LED 24, the switch 51 will remain in conduction until the current is reduced to near zero or attempts to reverse. This turn-off is controlled by the voltage induced in the rotor windings 19 presented to the commutator segments or bars 20. The voltage is determined by the line power and the rotor motion. Because of the nature of the devices 52, 53, a synchronization mode is created and the rotor 17 locks into the frequency. A motor provided with the circuitry of FIG. 4 will run at the synchronous speed as the load torque increases until a breakdown point. Thereafter, the motor will run at a speed that is lower than synchronous as the load torque increases. This motor has the advantage over other kinds of synchronous motors that operate from a single phase power supply in that it has a relatively large starting torque. As previously indicated, there are many ways, moreover, to control the LED light source 24 to alter the performance curve of the motor.

Figure 6:
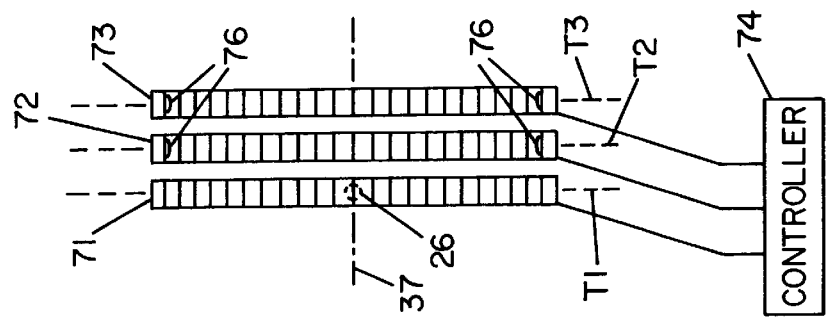
FIG. 6 is a diagrammatic view of a portion of the motor of FIG. 5 taken from the view 6—6 indicated in FIG. 5.
Figure 5:
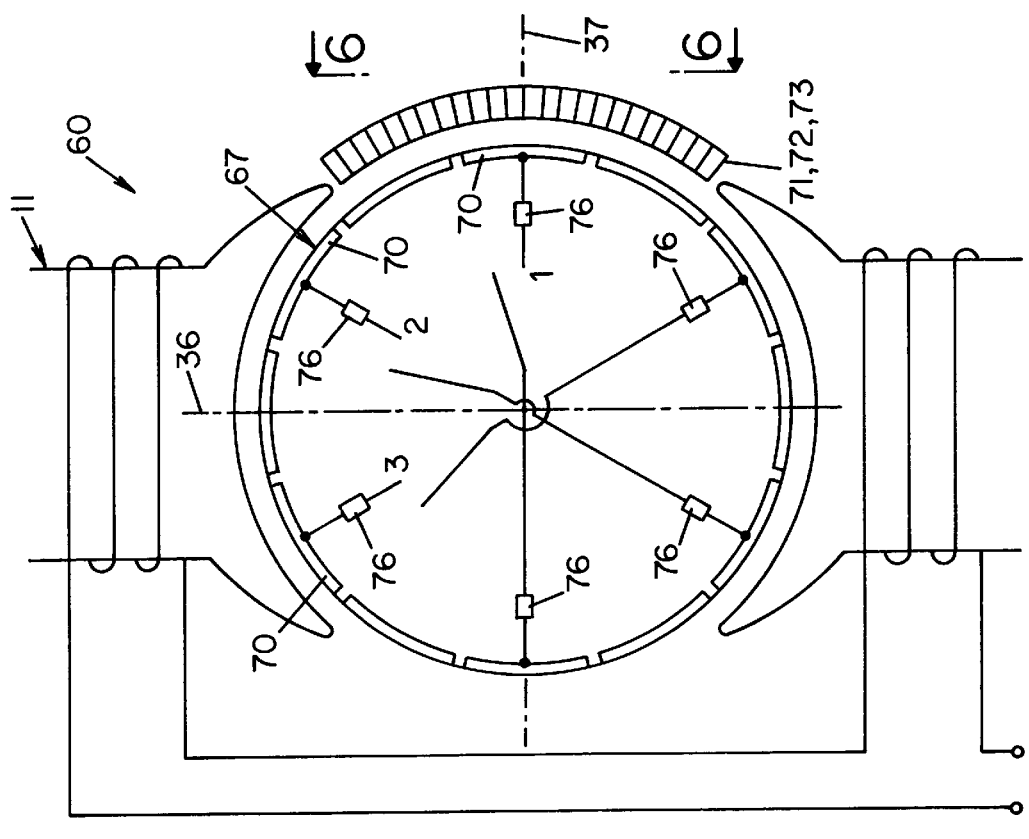
FIG. 5 is a diagrammatic representation of a repulsion motor useful as a stepping motor.

Reference is now made to FIGS. 5 and 6 where a repulsion motor 60, using the principles of the invention, is constructed with stepping motor characteristics. The motor 60 is similar in arrangement to that described in connection with FIGS. 1 and 2 as it pertains to a stator 11 and rotor 67. Electronic switches $S_1$, $S_2$ and $S_3$, such as shown in FIG. 2, are associated with commutator segments 70 that are spaced 60° apart on the circumference of the rotor. As before, it will be understood that signal responsive or sensing devices 76 (such as a light guide or the lens of a photosensitive device) are angularly centered with respect to a corresponding commutator bar or segment 70. In this embodiment, however, each electronic switch $S_1$–$S_3$ has two diametrically opposed signal sensing devices 76 and the sensing devices of each electronic switch $S_1$, $S_2$ and $S_3$ rotate in a separate track or path $T_1$, $T_2$ and $T_3$. The circumferential tracks or paths $T_1$–$T_3$ of the individual pairs of sensing devices 76 are axially displaced from one another as indicated in FIG. 6. For each switch circuits $S_1$, $S_2$ and $S_3$, and each pair of associated sensing devices 76, there is a separate energizing light signal source 71, 72 and 73. Each signal source 71–73 extends through an arc of 120° about the circumference of the path of its respective signal sensing devices 76. Since each circuit $S_1$–$S_3$ has a pair of diametrically opposed sensing means 76, a signal source 71–73 need only be provided on one side of the rotor or armature. The signal sources 71–73 are appropriately mounted or fixed relative to the stator.

Each energizing signal source 71, 72 or 73 is comprised, for example, of a plurality of discrete LEDs that collectively cover a full 120° of arc. A study of FIG. 6 shows that in rotation of the rotor, the sensing devices or photodetectors 76 of each electronic circuit sweeps in its track $T_1$, $T_2$ or $T_3$ in a path axially aligned with an associated LED array 71, 72 or 73.

In operation, only one light array 71, 72 or 73 is operated or switched on by a controller 74 at any time. Where the LED array 71 associated with $S_1$ is activated, the rotor 67 moves to the position illustrated in FIG. 5 where the associated sensor 76 and commutator segment 70 is aligned with the neutral axis 37. When the LED array 72 for $S_2$ is switched on, $S_2$ becomes closed or conductive and the rotor 67 will move to a position where its sensor 76 is aligned with the neutral axis 37. Then, if the array 72 is turned off, then the array 73 is turned on, the rotor 67 will move to a position with the $S_3$ sensor 76 in line with the neutral axis 37. From the foregoing, it will be evident that full rotation of the rotor 67 or reverse rotation is achieved by repeating or reversing the cycle of operation of the arrays 71–73. The number and location of the electrical switches $S_1$–$S_3$ and number of arrays 71–73 can be varied to meet the demands of a particular application. The motor 60, or others with similar construction, can be used in applications where conventional stepping motors are used.

The repulsion stepping motor 60 can be used as a synchronous variable speed motor by controlling the rate or frequency by which the LED array 71–73 are switched on and off. In this case, the control or amplifier 74 controls the power to the LED arrays 71–73 which may be in the order of milliwatts and the motor 60 can develop hundreds of watts. In typical present day stepping motors, all of the motor power passes through the control electronics.

The electronically controlled switch $S_i$ of the various disclosed embodiments can be implemented in many ways besides those disclosed that operate with phototransistors or othee photoresponsive devices. Other non-contact devices include Hall effect transistors that sense a magnetic field that can be produced by a permanent magnet or an electromagnet that substitutes for a light source.

Figure 7:
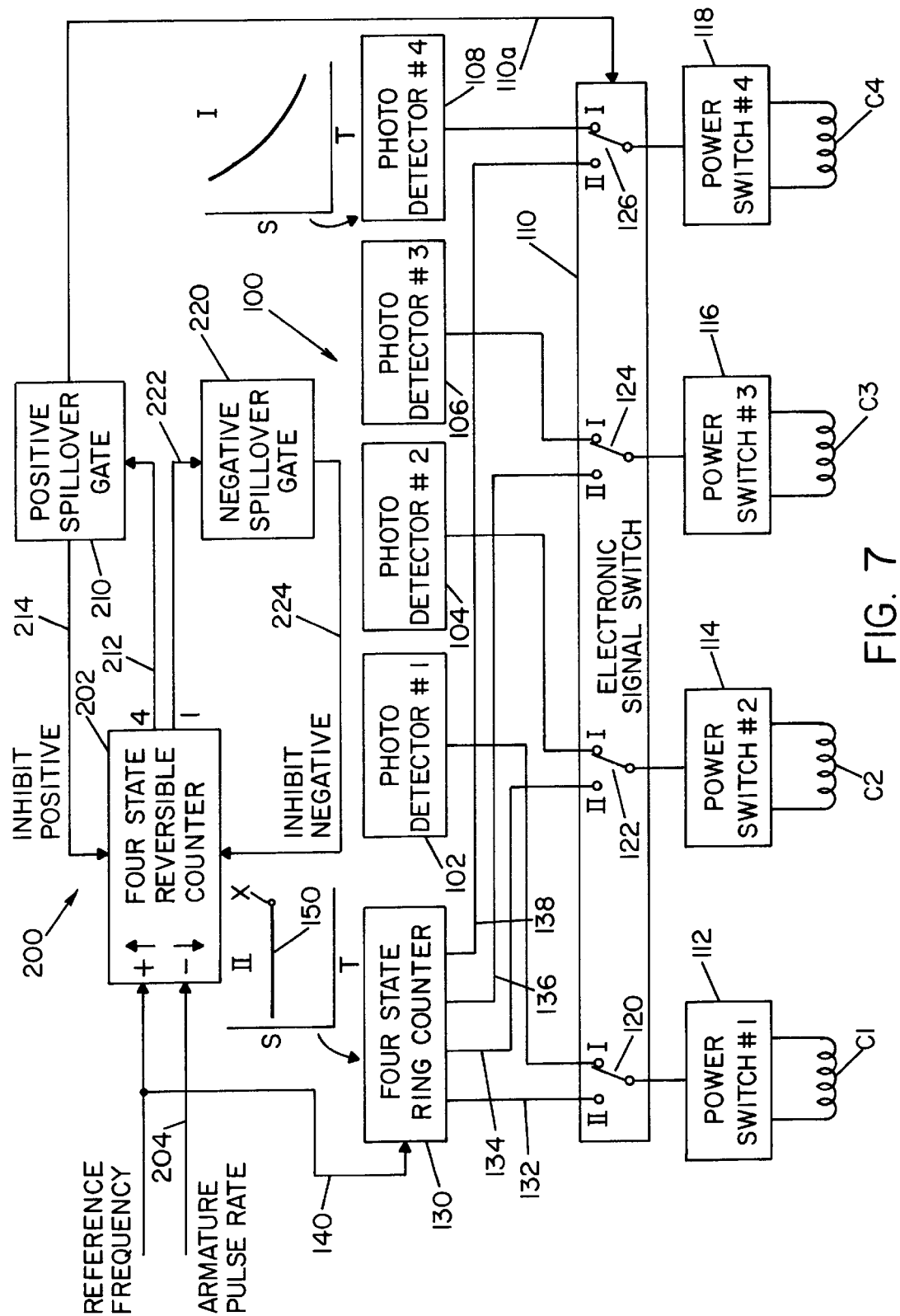
FIG. 7 is a combined block diagram and wiring diagram illustrating the preferred embodiment of the present invention.
Figure 11:
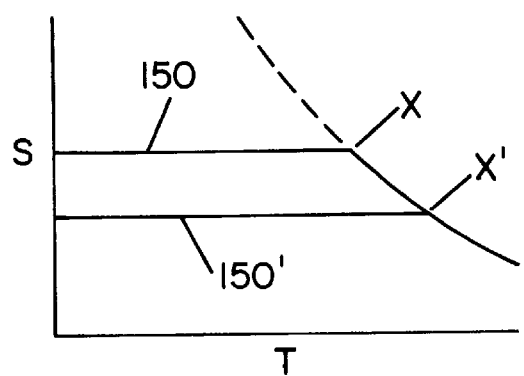

By using the brushless repulsion motor so far described, the operating speed/torque curve includes a gradually decreasing speed as the torque increases. To provide a speed control system for this brushless repulsion motor, the embodiment of the invention illustrated in FIG. 7 provides a speed control portion for the operating curve of the repulsion motor. Referring now to FIG. 7 wherein the preferred embodiment is illustrated as including a speed control system 100 employing the previously described positional detectors 102, 104, 106 and 108 for closing power switches 112, 114, 116, 118, respectively, by manipulation of selector switch 110. Switches 112–118 short, in sequence, coils C1, C2, C3 and C4 in accordance with the previous discussion of the brushless repulsion motor in FIGS. 1–6. Selector switch 110 includes individual electronic selector switches 120, 122, 124 and 126 which are shiftable from a first mode, mode I, that operates in accordance with the speed/torque curve labeled I and a second mode, mode II, which operates in accordance with the speed/torque curve labeled II. The logic on line 110a is the shift signal to shift from mode II to mode I when the repulsion motor reaches a maximum torque at a given set speed, as indicated by point X on the mode II curve. During the initial mode II operation, the repulsion motor is controlled by four stage ring counter 130 which counter, of course, can be a ten stage counter with a reset at stage 5. Operation of the counter creates switch closing signals in output lines 132, 134, 136 and 138 at a rate corresponding to the frequency of pulses at the input line 140 of the counter, which pulse rate is the reference frequency for controlling the speed of the motor during the speed control mode II. As so far described, the motor can have switches 112–118 close at a rate and in sequence by counter 130 having a rate determined by the frequency on line 140. Thus, there is no need for the external positional markers or detectors 102–108. Operation in mode II causes a constant speed curve 150 shown in the speed/torque curve II positioned above counter 130. When operated in mode II, switches 112–118 are closed at a specific position of rotation of the armature. In accordance with the invention, switch 110 is shifted from mode II to mode I upon receipt of a signal in line 110a which signal is created when the speed of the armature tends to be reduced below set speed 150 indicating a maximum torque has been created. This occurs at point X. The shift is accomplished by testing for, or sensing, maximum torque at set speed 150 to create a combined operating curve as shown in FIG. 11. The repulsion motor operates at controlled set speed 150 until the load causes a torque exceeding the maximum capability of the motor. At that time, the speed of the motor tends to decrease. Switch 110 shifts to operate in prior used mode I. By using the present invention, the speed can be changed by changing the reference frequency of the pulses on line 140, which frequency change will create a different constant or set speed 150'. At this new set speed which is illustrated as lower than set speed 150', the motor has the capacity to maintain the speed at greater torques; however, at point X' the maximum torque is reached causing a shift to mode I.

A variety of arrangements could be used for sensing the maximum torque or the decrease of torque during a constant speed mode of operation, i.e. mode II. In accordance with the preferred embodiment of the invention, a torque responsive circuit 200 senses the maximum torque to create a shift signal in line 110*a*. A reversible up/down counter 202 includes an up counting input controlled by the frequency on up count input line 140, which is also the previously discussed reference frequency. The down count of counter 202 is the frequency of pulses on line 204, which frequency is set to represent armature speed. When armature speed is less than the set speed controlled by the frequency on line 140, the down count frequency is less than the up count frequency. Thus, reversible four state counter 202 reaches a count 4 to toggle spillover gate 210 by a signal in input line 212 from counter 202. This spillover gate produces a shift signal in line 110*a* and an inhibit signal in line 214. The inhibit signal inhibits the up count operation of counter 202. As the speed decreases in accordance with curve shown in FIG. 11, mode I is maintained. If the speed increases as shown in the curve representing mode I, armature speed tends to exceed the set speed 150. When this occurs, counter 204 drops below count 4 to deactivate the shift signal on line 110*a*. Also, the inhibit signal on line 214 is removed. The repulsion motor then operates in accordance with constant speed mode II. If the speed of the motor tends to increase rapidly, counter 202 counts down to state 1 to activate the spillover gate 220 by a signal in line 222. This creates an inhibit signal in line 224. This use of a second inhibit signal maintains counter 202 in a very narrow range of operation to create a digital speed integrator. Other arrangements could be used for sensing the stall of the motor and shift the motor into the mode of operation indicated as mode I.

Figure 8:
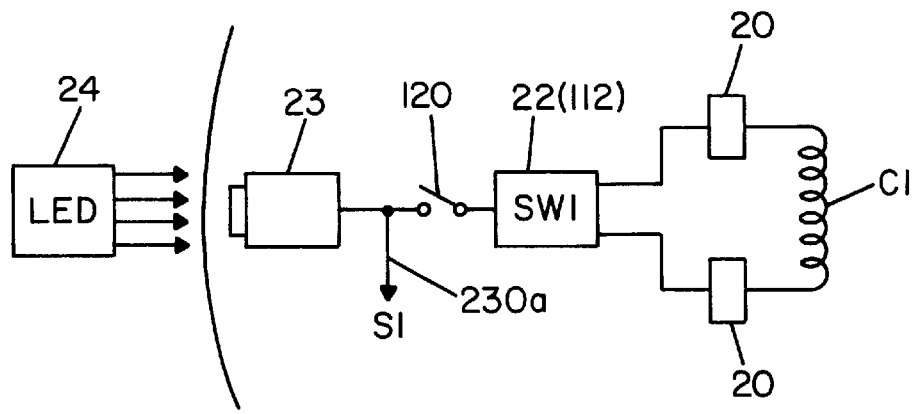
FIG. 8 is a block diagram illustrating the preferred circuit for accomplishing the armature pulse rate used in the invention.
Figure 9:
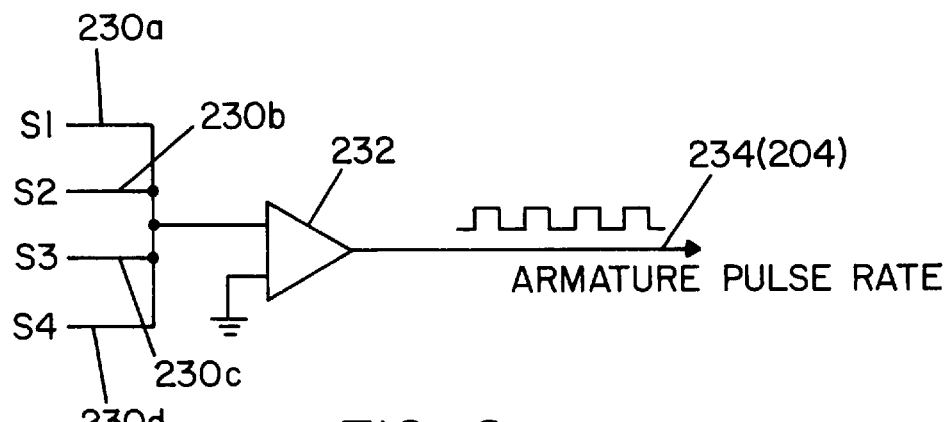
FIG. 9 is a wiring diagram utilizing the signals created by the circuit show in FIG. 8.
Figure 10:
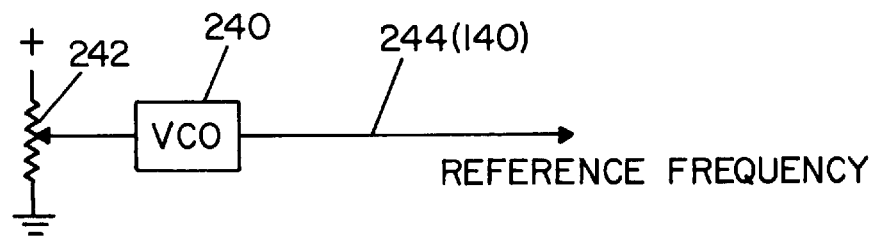
FIG. 10 is a wiring diagram illustrating the oscillator on the armature for creating a reference frequency.
Figure 10A:
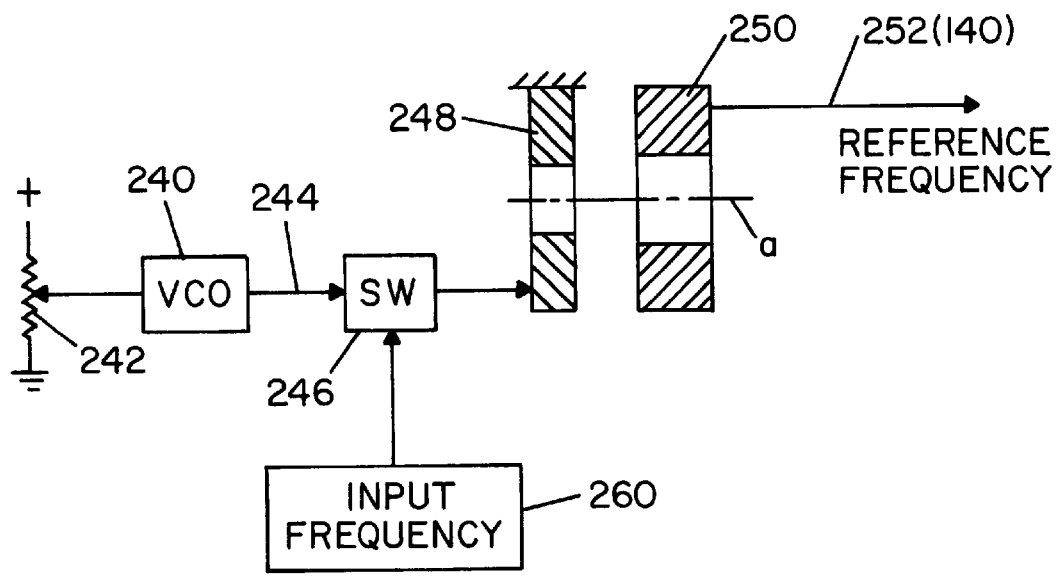
FIG. 10A is a modification of the circuit shown in FIG. 10 utilizing an arrangement for mounting the circuit of FIG. 10 externally of the armature; and, FIG. 11 is a speed/torque curve illustrating the operating characteristics of the brushless repulsion motor using the preferred embodiment of the invention shown in FIGS. 7–10.

FIGS. 8–10 illustrate the circuit employed in the preferred embodiment of the invention to create the reference frequency on line 140 and the armature speed representative signal on line 204. In FIG. 8, the light source, positional marker or LED 24 is fixed at a given location on the stator. A light signal is projected toward the armature carried photo transistors 23 constituting detectors 102–108. The output of detector 23 is directed through switch 120 so switch 22 or switch 112 shorts coil C1 by closing a switch that shorts segments 20. Detector 23 also creates a tachometer like signal S1 at output line 230*a* of detector 23. The other three detectors 104–108 create tachometer signals S2, S3 and S4 in lines 230*b*, 230*c* and 230*d*, respectively. The signals S1–S4 are summed by amplifier 232 to produce a pulse adding signal in line 234, which signal is the armature pulse rate for line 204 shown in FIG. 6. Consequently, the frequency of the armature pulse rate is dependent upon the rotational speed of the armature. It is possible to use only one detector 23 to create a pulse signal having a rate representing armature speed. To create a reference frequency in line 140 of FIG. 7, a voltage controlled oscillator 240 as shown in FIG. 10 has its output frequency controlled by rheostat 242 on the armature. Thus, the frequency on line 244 is adjustable to the desired frequency to control set speed 150 or set speed 150' during mode II. The reference frequency appears in line 244 which is directed to line 140 in FIG. 7. In some instances, it is desirable to mount the reference frequency generator on the stator so that the reference frequency can be easily adjusted by rheostat 242 which is stationary and not rotating. This modification is shown in FIG. 10A wherein the oscillator 240 and rheostat 242 are fixed with respect to the stator to create the reference frequency in line 244. This frequency is directed to a two position switch 246 to drive a transmitter magnetic ring 248 positioned on the stator in close proximity to an armature mounted rotating receiving ring 250. Ring 250 rotates with the armature about motor axis a. Receiver ring 250 transmits the received reference frequency by line 252 to line 140, shown in FIG. 7. To synchronize the motor, a reference frequency can be obtained from an external input frequency source 260 directed to switch 246. Switch 246 directs this frequency signal to transmitter ring 248 to create the input frequency on line 140.

Other changes could be made in the circuitry for creating the frequency on lines 140 and 204 as well as for detecting the maximum torque during mode II.

Having thus described the invention, the following is claimed:

1. An armature mounted armature speed control system for a brushless repulsion motor of the type including a series of coil switches on said armature for shorting a succession of armature coils and detectors on said armature for operating each of said switches when the armature coil shorted by said switch is at a selected rotational position, said system comprising: a ring counter with sequentially energized output lines for receiving signals in sequence at a rate controlled by the reference frequency of count pules at the input of said counter, means for operating said switches in sequence by said counter created signals to control the speed of said armature at a set point determined by said reference frequency, and a selector switch shiftable upon receipt of a shift signal between a first condition with said signals from said counter operating said coil switches and a second condition with said detectors operating said coil switches.

2. A speed control system as defined in claim 1 including means for adjusting the frequency of said count pulses at the input of said ring counter to change the speed of said armature.

3. A speed control system as defined in claim 2 including means for sensing a decrease of the speed of said armature to shift said selector switch from said first condition to said second condition.

4. A speed control system as defined in claim 3 wherein said sensing means is an up/down counter with the up count input operated by said count pulses and the down count input operated by pulses at a detected frequency proportional to the actual speed of said armature and a spill over gate to create said shift signal when said up count exceed said down count by a selected number.

5. A speed control system as defined in claim 4 wherein said spillover gate includes means for inhibiting said up/down counter when said shift signal is created.

6. A speed control system as defined in claim 2 wherein said reference frequency is created by a voltage controlled oscillator.

7. A speed control system as defined in claim 6 wherein said oscillator is in a fixed position and a transmission mechanism including a fixed element and a rotating element on said armature transmits said count pulses to said armature.

8. A speed control system as defined in claim 1 including means for sensing a decrease of the speed of said armature to shift said selector switch from said first condition to said second condition.

9. A speed control system as defined in claim 8 wherein said sensing means is an up/down counter with the up count input operated by said count pulses and the down count input operated by pulses at a detected frequency proportional to the actual speed of said armature and a spill over gate to create said shift signal when said up count exceed said down count by a selected number.

10. A speed control system as defined in claim 9 wherein said spillover gate includes means for inhibiting said up/down counter when said shift signal is created.

11. A speed control system as defined in claim 8 wherein said reference frequency is created by a voltage controlled oscillator.

12. A speed control system as defined in claim 11 wherein said oscillator is in a fixed position and a transmission mechanism including a fixed element and a rotating element on said armature transmits said count pulses to said armature.

13. A speed control system as defined in claim 1 wherein said reference frequency is created by a voltage controlled oscillator.

14. A speed control system as defined in claim 13 wherein said oscillator is in a fixed position and a transmission mechanism including a fixed element and a rotating element on said armature transmits said count pulses to said armature.

15. A method of operating a brushless repulsion motor of the type including a series of coil switches on the armature for shorting a succession of armature coils and detectors on said armature for operating each of said switches when the armature coil shorted by said switch is at a selected rotational position, said method comprises the steps of:

(a) maintaining a set armature speed by deactivating said detectors and operating said switches in sequence at a set frequency;

(b) sensing when said armature speed is reduced by reaching maximum torque; and, (c) then operating said switches by closing said switches when the respective coils are in said selected rotational position by activating said detectors and deactivating said set frequency operation of said switches.

16. The method as defined in claim 15 including the step of adjusting said set frequency.

* * * * *